United States Patent Office 3,746,530
Patented July 17, 1973

3,746,530
HERBICIDAL 4-METHOXY-2,6-DIAMINO-s-TRIAZINES
Dagmar Berrer, Riehen, and Christian Vogel, Binningen, near Basel, Switzerland, assignors to Ciba-Geigy Corporation
No Drawing. Original application Mar. 14, 1969, Ser. No. 807,430, now Patent No. 3,629,258. Divided and this application Apr. 9, 1971, Ser. No. 132,883
Claims priority, application Switzerland, Mar. 20, 1968, 4,149/68
Int. Cl. A01n 9/22
U.S. Cl. 71—93
7 Claims

ABSTRACT OF THE DISCLOSURE

Methoxy-triazine derivatives of the formula

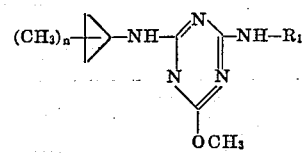

wherein $n$ means 0 or 1, and $R_1$ represents certain unsubstituted or substituted alkyl or cycloalkyl groups are disclosed as herbicidally active compounds of enhanced toxicity to undesirable plant growth and improved selectivity. A method of controlling undesirable plant growth with the aid of such compounds and compositions containing them are also described.

CROSS REFERENCE TO RELATED APPLICATION

This is a division of application Ser. No. 807,430, filed Mar. 14, 1969, now U.S. Pat. No. 3,629,258.

The present invention concerns new 4-methoxy-2,6-diamino-s-triazines, processes for the production thereof, the use of the new triazines for controlling weeds and wild grasses, also compositions containing these new active substances and which are used for controlling weeds and wild grasses, and processes for the control of weeds and wild grasses using the new active substances or the agents containing the latter.

4-methoxy-2,6-diamino-s-triazines are already known, e.g. from British Pat. No. 814,948.

4-methoxy-2,6-diamino-s-triazines of the Formula I,

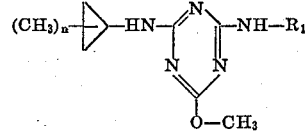

wherein $R_1$ represents methyl, ethyl, isopropyl, cyclopropyl, 1-methyl cyclopropyl, sec. butyl, tert. butyl, isobutyl, β-methoxy-ethyl, γ-methoxy-n-propyl, 1-cyanoethyl-(1), 1-cyanoprop-(1)-yl, 2-cyanopropyl-(2)-yl, 2-cyanobut-(2)-yl or 3-cyanopent (3)-yl, and
$n$ represents 0 or 1, on the contrary have not been known hitherto.

These new triazine derivatives with cyclopropyl groups are obtained according to the present invention by reacting a chloro-bis-amino-s-triazine of the Formula II

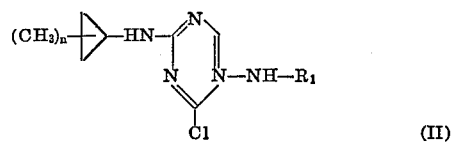

wherein $R_1$ and $n$ have the meanings given under Formula I, with an alkali methylate, preferably sodium methylate. Instead of the stated alcoholate it is also possible to use the corresponding alkali metal hydroxide with methanol.

The new s-triazines of the Formula I exhibit very good herbicidal properties and are extremely suitable for controlling weeds and wild grasses. Compared with the herbicides hitherto known from the series of triazines, the new s-triazines possess an appreciably wider range of activity. They are also characterised in that they take effect more rapidly and have low phytotoxicity with respect to particular cultivated plants. Special emphasis is to be placed on the good herbicidal action on weeds and wild grasses which are difficult to control such as, for example, camomile, varieties of millet and umbel growth. Thus the active substances according to the invention are more suitable for the total control of weeds than triazines hitherto known and used for this purpose, e.g. the known 4-methoxy-2,6-bis-isopropylamino-s-triazine.

The following tests serve to illustrate the herbicidal action of the new s-triazine derivatives compared with the known 4 - methoxy - 2,6-bis-isopropylamino-s-triazine (British Pat. No. 814,948).

(1) HERBICIDAL ACTION ON WEEDS BY POST-EMERGENCE APPLICATION (A) Test plants (1) Camomile, as being representative of weeds which are difficult to control;
(2) Millet, as being representative of wild grasses which are difficult to control;
(3) Pastinaca, as being representative of umbel growth.

In a greenhouse, weeds are sown 0.5 cm. deep in sterile soil. In the 2–3-leaf stage, the plants are sprayed with dispersions of active substance on a spraying-bench. The treated plants are then kept in an air-conditioned chamber in daylight at 22° C. and 70% relative humidity.

The evaluation of the results is made after 11, or 8–11 days according to the following scale:

0 plants undamaged
1 slightly damaged
2 50% of plants damaged
3 75% of plants damaged
4 plants destroyed.

The amounts of active substances applied (kg./hectare) and the length of the tests (in days) are given at the top of the tables. The active substance dispersions had the following composition: 25 parts of active substance, 8.5 parts of lignin sulphonic acid calcium salt, 1.5 parts of adhesive (1:1 polyvinylpyrrolidone:Champagne chalk), 32 parts of kaolin, 33 parts of Champagne chalk—dispersed in a quantity of water corresponding to 1000 litres per hectare.

TABLE I

| Compound | Camomile, 11 days | | Millet, 11 days | | Pastinaca, 8-11 days | | |
|---|---|---|---|---|---|---|---|
| | 0.5 | 1 kg. | 0.2 | 0.5 | 0.2 | 0.5 | 1 kg. |
| 4-methoxy-2-ethylamino-6-cyclopropylamino-s-triazine | 3.5 | 4 | 3 | 3.5 | | 4 | 4 |
| 4-methoxy-2-(γ-methoxypropylamino)-6-cyclopropylamino-s-triazine | 3 | | 3 | 3 | | | |
| 4-methoxy-2-isopropylamino-6-cyclopropylamino-s-triazine | 4 | 4 | | | 3.5 | 3.5 | 3.5 |
| 4-methoxy-2,6-bis-cyclopropylamino-s-triazine | 4 | 4 | | | | | |
| 4-methoxy-2-sec.butylamino-6-cyclopropylamino-s-triazine | 4 | 4 | | | | | |
| 4-methoxy-2-methylamino-6-cyclopropylamino-s-triazine | 4 | 4 | | | | | |
| 4-methoxy-2-tert.butylamino-6-cyclopropylamino-s-triazine | 3 | 3.5 | | | | | |
| 4-methoxy-2,6-bis-isopropylamino-s-triazine (known) | 0.5 | 1.5 | 1 | 2.5 | 0 | 0 | 0 |

TABLE II.— PASTINACA

| Compound | 5 kg./ha., after (days)— | | 3 kg./ha., after (days)— | | 2 kg./ha., after (days)— | | 1 kg./ha., after (days)— | | 0.5 kg./ha., after (days)— | |
|---|---|---|---|---|---|---|---|---|---|---|
| | 8 | 28 | 8 | 28 | 8 | 28 | 8 | 28 | 8 | 28 |
| 4-methoxy-2-isopropylamino-6-cyclopropylamino-s-triazine | 4 | 4 | 4 | 4 | 3.5 | 4 | 3.5 | 4 | 3.5 | 4 |
| 4-methoxy-2,6-bis-isopropylamino-s-triazine (known) | 1 | 3.5 | 0.5 | 3.5 | 0 | 2.5 | 0 | 2.5 | 0 | 0 |

(B) Method

The test plants are sown in a freshly prepared seed bed. 22 days after emergence of the plants, the active substance is applied as an aqueous dispersion prepared from a 25% wettable powder. The phytotoxic effect on the cultivated plants is ascertained 32 days after treatment and expressed in percent of the total plant growth, i.e. the percents of the plants which have been destroyed.

Test substances (I) 4-methoxy - 2 - isopropylamino - 6 - cyclopropylamino-s-triazine (according to the invention);

(II) 4-methoxy - 2 - tert.butylamino - 6 - cyclopropylamino-s-triazine (according to the invention);

(III) 4-methoxy - 2,6 - bis-isopropylamino - s - triazine (known from British Pat. No. 814,948).

RESULTS

| Substance | Concentration in kg./ha. | Phytotoxic effect in percent on— | | | |
|---|---|---|---|---|---|
| | | Oats | Mustard | Ray grass | Cleavers (Galium aparine) |
| I | 1 | (−) | (−) | 98 | 98 |
| | 1.5 | (−) | (−) | 98 | 98 |
| | 2 | (−) | (−) | 98 | 98 |
| II | 1 | 70 | 98 | 70 | (−) |
| | 1.5 | 70 | 98 | 98 | (−) |
| | 2 | 70 | 98 | 100 | (−) |
| III | 1 | 0 | 30 | 0 | 30 |
| | 1.5 | 30 | 30 | 0 | 30 |
| | 2 | 30 | 30 | 30 | 30 |

NOTE.—(−) means that no tests were carried out.

HERBICIDAL ACTION BY PRE-EMERGENCE APPLICATION

Test plant: oats, being representative of grasses

Soil, mixed with the active substance to be tested, was applied to the surface of moist sterile soil in pots. The oats seeds were then sprinkled on to the soil containing the herbicide and then covered over with moist, sterile soil. The pots were subsequently kept in an air-conditioned chamber at 22° C. and with 70% relative humidity. After 20 days, the action of the new s-triazines was compared with that of the known 4-methoxy-2,6-bis-isopropylamino-s-triazine and expressed in percent. The amount of active substance applied in each case is given at the top of the table.

TABLE III

| Compound | Damage to oats in percent at a concentration of mg. of active substance per litre of sod | | |
|---|---|---|---|
| | 0.4 | 1.6 | 6.25 |
| 4-methoxy-2-isopropylamino-6-cyclopropylamino-s-triazine | 100 | 100 | 100 |
| 4-methoxy-2-sec.butylamino-6-cyclopropylamino-s-triazine | | 100 | 100 |
| 4-methoxy-2,6-bis-isopropylamino-s-triazine (known) | 0 | 75 | 100 |

Herbicidal compositions are produced by mixing the active substances with suitable carriers and/or dispersing agents. In order to broaden the range of action of the triazine derivatives according to the invention, other herbicides can be added to these compositions, e.g. herbicides from the series of triazines such as other halogen-diamino-s-triazines, alkoxy and alkylthiodiamino-s-triazines, triazoles, diazines such as uracils, aliphatic carboxylic acids and halogen carboxylic acids, halogenated benzoic acids and phenyl acetic acids, aryloxyalkane carboxylic acids, hydrazides, amides, nitriles and esters of such carboxylic acids, carbamic acid esters and thiocarbamic acid esters, ureas, etc.

The following examples describe the production of the new s-triazines. The temperatures are given in degrees centigrade.

EXAMPLE 1

10.7 g. of 2-ethylamino - 4 - chloro - 6 - cyclopropylamino-s-triazine are added to a solution of 2.2 g. of sodium in 250 ml. of absolute methanol and the mixture is refluxed for 18 hours. The methanol is then distilled off and the residue poured into 600 ml. of water. The aqueous solution is then repeatedly extracted with acetic acid ethyl ester. After neutral washing and drying, the solvent is distilled off.

The residue is triturated with petroleum ether, separated and dried. The 2 - ethylamino - 6 - cyclopropylamino-4-methoxy-s-triazine melts at 75–77°.

EXAMPLE 2

8 g. of 4-chloro - 2,6 - bis-cyclopropylamino-s-triazine are added to a solution of 1.3 g. of sodium in 150 ml. of methanol and the mixture is refluxed for 20 hours. The reaction mixture is then liberated in vacuo from a part of the methanol and added to 600 ml. of water. After 24 hours, the 2,6-bis-cyclopropylamino-4-methoxys-triazine crystallises out, is separated, washed, dried and recrystallised from cyclohexane, M.P. 100.5–104°.

EXAMPLE 3

24.2 g. of 4-chloro - 2 - isobutylamino - 6 - cyclopropyl-amino-s-triazine are added to a solution of 4.01 g. of sodium hydroxide in 120 ml. of methanol and the mixture is refluxed for 18 hours. The reaction mixture is then liberated in vacuo from most of the methanol and added to 500 ml. of water. After 48 hours, the 4-methoxy-2-isobutylamino - 6 - cyclopropylamino-s-triazine crystallises out, is filtered, washed, dried and recrystallised from cyclohexane. It melts at 83–84°.

Using the methods described in the preceding examples, the s-triazines listed in the following table were obtained using equimolar amounts of sodium methylate and the corresponding 4-chloro-2,6-bis-amino-s-triazine:

| Compound | N.P.=Melting point B.P.=Boiling point |
|---|---|
| 4-methoxy-2-methylamino-6-cyclopropyl-amino-s-triazine. | M.P.: 101–103°. |
| 4-methoxy-2-isopropylamino-6-cyclo-propylamino-s-triazine. | M.P.: 75–76°. |
| 4-methoxy-2-sec.butylamino-6-cyclo-propylamino-s-triazine. | B.P.: 150–155°/0.001 torr. |
| 4-methoxy-2-tert.butylamino-6-cyclo-propylamino-s-triazine. | M.P.: 110–112°. |
| 4-methoxy-2-(B-methoxy-ethylamino)-6-cyclopropylamino-s-triazine. | M.P.: 89–93°. |
| 4-methoxy-2-(γ-methoxy-propylamino)-6-cyclopropylamino-s-triazine. | M.P.: 104–106°. |
| 4-methoxy-2-ethylamino-7-(2'-methyl-cyclopropylamino)-s-triazine. | M.P.: 75–78°. |
| 4-methoxy-2-isopropylamino-6-(2'-me-thylcyclopropylamino)-s-triazine. | B.P.: 132–134°/0.065 torr. |
| 4-methoxy-2-[2'-cyanoprop-(2')-yl-amino]-6-cyclopropylamino-s-triazine. | M.P.: 131–133°. |
| 4-methoxy-2-ethylamino-6-(1'-methyl-cyclopropylamino)-s-triazine. | |
| 4-methoxy-2-isopropylamino-6-(1'-methyl-cyclopropylamino)-s-triazine. | |
| 4-methoxy-2-sec.butylamino-6-(1'-methyl-cyclopropylamino)-s-triazine. | |
| 4-methoxy-2-tert.butylamino-6-(1'-methyl-cyclopropylamino)-s-triazine. | |
| 4-methoxy-2-tert.butylamino-6-(2'-methyl-cyclopropylamino)-s-triazine. | M.P.: 109–112°. |
| 4-methoxy-2-[2'-cyanoprop-(2')-ylamino]-6-(1''-methylcyclopropylamino)-s-triazine. | |
| 4-methoxy-2-[2'-cyanoprop-(2')-ylamino]-6-(2''-methtlcyclopropylamino)-s-triazine. | |
| 4-methoxy-2-[2'-cyanobut-(2')-ylamino]-6-cyclopropylamino-s-triazine. | |
| 4-methoxy-2-[1'-cyanoethyl-(1')-amino]-6-cyclopropylamino-s-triazine. | |
| 4-methoxy-2-[3'-cyanopent-(3')-yl-amino]-6-cyclopropylamino-s-triazine. | |
| 4-methoxy-2-[1'-cyanoprop-(1')-ylamino]-6-cyclopropylamino-s-triazine. | |

The production of herbicidal compositions according to the invention is carried out in a known manner by mixing and grinding active substances of the general Formula I with suitable carriers, optionally with the addition of dispersing agents or solvents which are inert to the active substances. The active substances can exist and be used in the following forms:

as solids: sprinkling agents, granulates, coated granules, impregnated granules and homogeneous granules
as concentrates of active substances dispersible in water: wettable powder, pastes, emulsions
as liquids: solutions.

The solid forms (sprinkling agents, granulates) are produced by mixing the active substances with solid carriers. The grain size of the carriers for sprinkling agents is about 0.075 to 0.2 mm. and for granulates it is 0.2 mm. or above. The concentrations of active substance in the solid preparations are as a rule 0.5 to 80% by weight. To these mixtures can also be added additives which stabilise the active substance and/or non-ionic as well as anion-active substances which, for example improve the adhesion of the active substances on plants and parts of plants (glues and adhesives) and/or ensure a better wettability (wetting agents) and also dispersibility (dispersing agents). Concentrates of active substances which can be dispersed in water, i.e. wettable powders, pastes and emulsion concentrates, are agents which can be diluted with water to give a desired concentration. They consist of active substance, carrier, optionally additives for stabilising the active substance, surface active substances and anti-foaming agents and, optionally, solvents. The concentration of active substance in these agents is 5–80% by weight.

The wettable powders and pastes are obtained by mixing and grinding the active substances with dispersing agents and pulverulent carriers in suitable apparatus until homogeneity is attained. Suitable anti-foaming agents are, e.g. silicones etc. The active substances are so mixed, ground, sieved and strained with the above mentioned additives that the solid particle size in the case of wettable powders does not exceed 0.02–0.04 mm. and in the case of pastes 0.003 mm. Emulsion concentrates and pastes and produced by using dispersing agents, organic solvents and water. The solvents must be practically odorless, not phytotoxic, inert to the active substance and not easily inflammable.

Furthermore, the compositions according to the invention can be used in the form of solutions. For this application, the active substance or substances of the general Formula I are dissolved in suitable organic solvents, mixtures of solvents or in water. The solutions are to contain the active substances within a concentration range of 1–20% by weight.

Other biocidal active substances or agents can be mixed with the described agents according to the invention. Thus in addition to the stated compounds of the general Formula I and other herbicides, the new compositions can also contain, e.g., insecticides, fungicides, bactericides, fungistatics, bacteriostatics or nematocides, in order to widen the range of action. The composition according to the invention can also contain fertilisers, trace elements, etc.

Forms of preparation of these active substances are described in the following. Unless otherwise expressly stated, all parts and percentages are by weight.

Granulate

The following substances are used to produce a 5% granulate:

5 parts of 4-methoxy-2-tert.butylamino-6-cyclopropyl-amino-s-triazine
0.25 part of epichlorohydrin
0.25 part of cetyl polyglycol ether with 8 mol ethyleneoxide
3.50 parts of Carbowax (molecular weight about 400)
91 parts of kaolin (grain size 0.3–0.8 mm.).

The active substance is mixed with epichlorohydrin and dissolved with 6 parts of acetone. Polyglycol and cetyl polyglycol ether are then added. The solution thus obtained is sprayed onto kaolin and the acetone is then evaporated in vacuo.

Wettable powder

The following constituents are used to produce (a) a 50% wettable powder, (b) a 25% wettable powder, and (c) a 10% wettable powder:

(a)

50 parts of 4-methoxy-2-ethylamino-6-cyclopropylamino-s-triazine
5 parts of sodium dibutyl naphthyl sulphonate
3 parts of naphthalene sulphonic acid/phenolsulphonic/formaldehyde condensate 3:2:1
20 parts of kaolin
22 parts of Champagne chalk.

(b)

25 parts of 4-methoxy-2-[2'-cyanoprop-(2')-ylamino]-6-cyclopropylamino-s-triazine
5 parts of oleyl-methyl tauride-Na-salts 2.5 parts of naphthalene sulphonic acid/formaldehyde condensate
82 parts of kaolin.

The stated active substance is drawn onto the corresponding carriers (kaolin, chalk) and subsequently mixed and ground. A wettable powder is obtained having an excellent wettability and suspension properties. Suspensions of any desired active substance concentration can be prepared from such a wettable powder by diluting with water.

Paste

The following substances are used to produce a 45% paste:

45 parts of 4-methoxy-2-isobutylamino-6-cyclopropyl-amino-s-triazine
5 parts of sodium aluminium silicate
14 parts of cetyl polyglycol ether (Genapol O-080, trademark)
1 part of cetyl polyglycol ether (Genapol O-050, trademark)
2 parts of spindle oil
10 parts of polyglycol ("Carbowax," trademark)
23 parts of water.

The active substance is intimately mixed and ground with the additives in suitable equipment. A paste is obtained from which, by dilution with water, suspensions of any desired concentration can be produced.

Emulsion concentrate

The following are mixed together to produce a 10% emulsion concentrate:

10 parts of 4-methoxy-2-tert.butylamino-6-cyclopropyl-amino-s-triazine
15 parts of oleyl polyglycol ether with 8 mol of ethylene oxide
75 parts of isophorone (3,5,5-trimethylcyclohex-2-en-1-one).

This concentrate can be diluted with water to obtain emulsions of suitable concentrations. Such emulsions are suitable for the controling of weeds in cultivated plantations, for which purpose application of amounts of about 0.5 to 3 kg. of a compound of Formula I per hectare of treated soil is recommended.

We claim:
1. A composition comprising a herbicidally effective amount of a compound of the formula

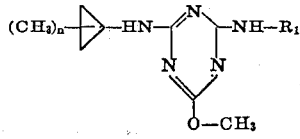

wherein
R₁ represents methyl, ethyl, isopropyl, cyclopropyl, 1-methylcyclopropyl, sec.butyl, tert.butyl, isobutyl, β-methoxyethyl, γ-methoxy-n-propyl, 1-cyanoethyl-(1), 1-cyanoprop-(1)-yl, 2-cyanoprop-(2)-yl, 2-cyanobut-(2)-yl or 3-cyanopent-(3)-yl; and $n$ represents the numbers 0 or 1, and an agriculturally acceptable carrier and/or dispersing agent.

2. A composition as defined in claim 1, wherein said compound is 4-methoxy-2-isopropylamino-6-cyclopropyl-amino-s-triazine.

3. A method for controlling weeds and wild grasses which comprises applying to such weeds or wild grasses a composition-of-matter comprising a herbicidally effective amount of a compound as defined in claim 1.

4. A method as described in claim 3, wherein said compound is 4 - methoxy - 2 - isopropylamino - 6 - cyclopropylamino-s-triazine.

5. A method as described in claim 3 wherein said compound is 4-methoxy-2-isobutylamino-6-cyclopropylamino-s-triazine.

6. A method as described in claim 3 wherein said compound is 4-methoxy-2-tert.butylamino - 6 - cyclopropyl-amino-s-triazine.

7. A method as described in claim 3 wherein said compound is 4-methoxy-2-[2'-cyanoprop-(2') - yl - amino]-6-cyclopropyl-s-triazine.

References Cited
UNITED STATES PATENTS

| | | | |
|---|---|---|---|
| 3,451,802 | 6/1969 | Neighbors et al. | 71—93 |
| 3,554,732 | 1/1971 | Priola | 71—93 |

JAMES O. THOMAS, JR., Primary Examiner

U.S. Cl. X.R.
71—92